United States Patent [19]

Kobayashi

[11] Patent Number: 4,535,591
[45] Date of Patent: Aug. 20, 1985

[54] REACTION FORCE MECHANISM FOR BRAKE POWER SERVO BOOSTER

[75] Inventor: Michio Kobayashi, Saitama, Japan

[73] Assignee: Jidosha Kiki Co., Ltd., Japan

[21] Appl. No.: 536,094

[22] Filed: Sep. 27, 1983

[30] Foreign Application Priority Data

Sep. 27, 1982 [JP] Japan ............................. 57-167850
Sep. 30, 1982 [JP] Japan ............................. 57-172402

[51] Int. Cl.³ .................... B60T 13/20; F15B 9/10
[52] U.S. Cl. ............................. 60/554; 60/562; 91/369 A; 91/376 R
[58] Field of Search .............. 91/370, 434, 371, 372, 91/373, 376 R, 369 A; 60/547.1, 552, 554, 562, 553

[56] References Cited

U.S. PATENT DOCUMENTS

| | | | |
|---|---|---|---|
| 2,929,216 | 3/1960 | Stelzer | 60/553 |
| 2,957,454 | 10/1960 | Stelzer | 60/551 |
| 3,246,579 | 4/1966 | Kellogg | 91/434 |
| 3,252,382 | 5/1966 | Kellogg et al. | 91/434 |
| 3,911,681 | 10/1975 | Sisco | 60/553 |
| 4,072,014 | 2/1978 | Gardner | 60/553 |
| 4,400,943 | 8/1983 | Belart | 60/562 |

FOREIGN PATENT DOCUMENTS 0045233 3/1982 European Pat. Off. .......... 60/567.1

Primary Examiner—Robert E. Garrett
Assistant Examiner—H. Edward Li
Attorney, Agent, or Firm—Sughrue, Mion, Zinn, Macpeak, and Seas

[57] ABSTRACT

A reaction force mechanism for a brake power booster includes an elastic member (53) which forms a hydraulic pressure reaction force chamber (50) and is spaced from an end surface (17d) of an input shaft (17) by a predetermined distance (δ) so that braking hydraulic pressure is not immediately detected by a driver. In addition, a passage (57) normally provides communication between the hydraulic pressure reaction force chamber and a primary side pressure chamber (45) of the master cylinder, and, alternatively, provides communication between the hydraulic pressure reaction force chamber and a secondary side pressure chamber (46) of the master cylinder when no hydraulic pressure is established in the primary side pressure chamber of the master cylinder.

18 Claims, 3 Drawing Figures

REACTION FORCE MECHANISM FOR BRAKE POWER SERVO BOOSTER

BACKGROUND OF THE INVENTION

The invention relates to a reaction force mechanism for a brake power servo booster and particularly to a reaction force mechanism for a brake power booster of the type in which a master cylinder is provided on a rear side or on a brake pedal side of a power booster mechanism having a power piston.

Conventionally, in the above-described type of reaction force mechanism for a brake power booster, it has been proposed that the thrust of the power piston be transmitted as reaction force to an input shaft through a reaction disc. In addition, a hydraulic pressure reaction chamber, into which a hydraulic pressure generated in a pressure chamber in the master cylinder is led, is provided so that the hydraulic pressure in the reaction force chamber can be transmitted as the reaction force to an input shaft, etc. The latter case where the reaction force mechanism utlizes hydraulic pressure is advantageous in that the arrangement can be made compact because the master cylinder is disposed on the brake pedal side. However, it is desirable to have the reaction force mechanism function so as to prevent the reaction force from being transmitted in the very beginning of the braking operation so that the driver is prevented from sensing the loss of reaction force before the braking begins to take effect. Conventionally, the hydraulic pressure reaction force mechanism having such a function as mentioned above has a complicated construction and requires a relatively large number of parts.

Further, all the conventionally known hydraulic pressure reaction force mechanisms are directed to a master cylinder of a single system. Accordingly, if such a conventional hydraulic reaction force mechanism is applied to a master cylinder of two systems, the hydraulic pressure is led into a hydraulic pressure reaction force chamber from one of the two systems. Therefore, in case the one system is damaged to make it impossible to generate the hydraulic pressure, the reaction force cannot be transmitted to the driver in spite of the fact that the braking operation is actually effected through the other system.

SUMMARY OF THE INVENTION

In view of the above-mentioned problems in the prior art, an object of the present invention is to provide a reaction force mechanism for a brake power booster in which an elastic member is provided such that it can be elastically deformed by the hydraulic pressure in a reaction force chamber so as to be operably connected with an input shaft of a master cyliner so that the hydraulic pressure in the reaction force chamber can be transmitted as reaction force to the input shaft through the elastic member only when the elastic member is operably engaged with the input shaft. In the thus arranged reaction force mechanism for a brake power booster according to the present invention, the above-mentioned function can be obtained by a very simple arrangement in which only an elastic member is provided.

Another object of the present invention is to provide a reaction force mechanism for a brake power booster in which a hydraulic pressure chamber is normally communicated with a pressure chamber on the primary side of a master cylinder and in case the system on the primary side is damaged to make it impossible to obtain the hydraulic pressure, the hydraulic pressure chamber is switched to communicate with a pressure chamber on the secondary side by utilizing the operation that the primary side piston approaches the secondary side piston, whereby, even in the case where the primary system is damaged, the reaction force can be obtained through the other secondary system in its normal state.

DETAILED DESCRIPTION OF THE PREFERRED EMBODIMENTS

Figures 1, 2:
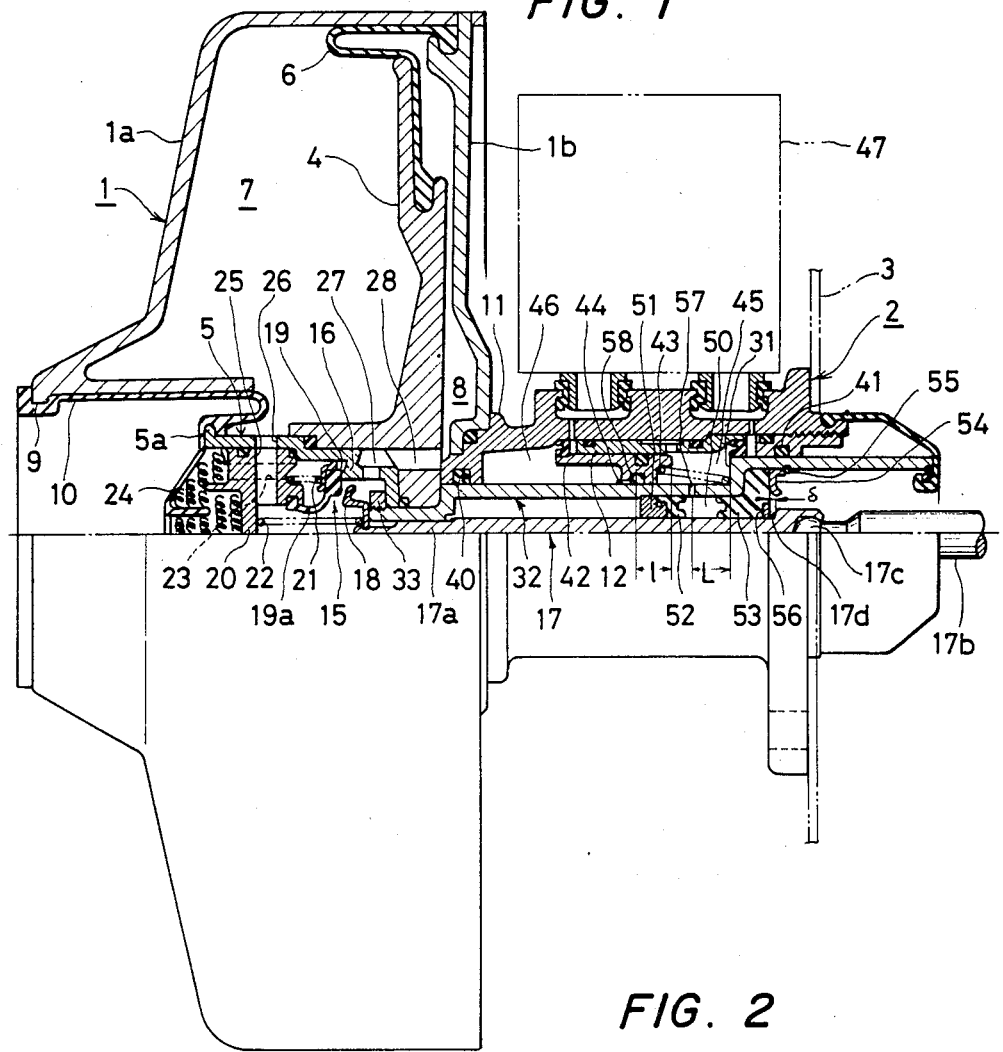
FIG. 1 is a partial cross-sectional view of an embodiment of the present invention.
FIG. 2 is a partial cross-sectional view of a main portion of FIG. 1 showing a different operational state than that shown in FIG. 1.

In FIG. 1, a shell 1 includes a front shell 1a and a rear shell 1b. A master cylinder 2 has a nose end portion and a base portion, the former being coupled with an axis portion of the rear shell 1b and the latter being fixed to a car body 3. A valve body 5 is integrally connection to a power piston 4, the power piston 4 and valve body 5 being reciprocably movable in the shell 1 along an axial direction of the shell 1. The inside of the shell 1 is partitioned into a constant pressure chamber 7 on the front shell 1a side and a variable pressure chamber 8 on the rear shell 1b side. These chambers are defined by a diaphragm 6 and the power piston 4.

The valve body 5 is generally formed into a substantially cup-like shape, and a cylindrical seal member 10 folded at its intermediate portion is provided between an edge portion 5a of an opening at a nose end portion of the valve body 5 and an opening 9 of the front shell 1a formed at its axis portion, such that the inside of the constant pressure chamber 7 is maintained airtightly and the nose portion of the valve body 5 is allowed to project outside of the opening 9.

A valve mechanism 15 for changing over fluid circuits is provided in the valve body 5. The valve mechanism 15 is provided with a first annular valve seat 16 formed in the inner periphery of the valve body 5, a second valve seat 18 provided at the tip portion of an input shaft 17 on the inner side of the first valve seat 16, and a valve member 19 which may seat onto the first and second valve seats 16 and 18 from the forward side in the operational direction of the power piston 4, that is from the left side in FIG. 1. The valve member 19 is urged to be seated onto the first valve seat 16 in the state as shown in FIG. 1 by a spring 21 provided between the valve member 19 and a closing member 20 for closing the axis opening of the valve body 5, while the second valve seat 18 of the input shaft 17 is urged to separate from the valve member 19, which has been seated on the first seat 16, by a spring 22 provided between the closing member 20 and the input shaft 17.

The valve member 19 has at its inner periphery a cylindrical seal portion 19a. The cylindrical seal portion 19a is connected to the closing member 20 so as to define a space by the outer periphery of the cylindrical seal portion 19a, the closing member 20 and the seal portion between the valve member 19 and the first valve seat 16, the space being communicated with the atmospheric air through a plurality of axial passages 23 and a filter 24 provided between the closing member 20 and the seal member 10. Another space defined by the inner periphery of the cylindrical seal portion 19a, the closing member 20, the input shaft 17, and the seal portion between the valve member 19 and the second valve seat 18 of the input shaft 17 is communicated with the constant pressure chamber 7 through a plurality of radial passages 25 formed in the closing member 20 and through a passage 26 formed in the valve body 5 while it is prevented from communicating with the axial passages 23. A further space defined in the intermediate portion between the seal portion between the valve member 19 and the first valve seat 16 and the seal portion between the valve member 19 and the second valve seat 18 is communicated with the variable pressure chamber 8 through a passage 27 radially formed in the valve body 5 and a passage 28 formed in the power piston 4.

The input shaft 17 includes a first input shaft 17a and a second input shaft 17b, the second valve seat 18 being provided at the tip of the first input shaft 17a. The first input shaft 17a is slidably passable through an axis portion of a housing 11 of the master cylinder 2. A forward end ball portion 17c of the second input shaft 17b is pivotally supported by the first input shaft 17a through a connection portion formed at the rear end portion of the latter, and the rear end portion of the second input shaft 17b is connected to a brake pedal (not shown). An output shaft 32 for transmitting the thrust of the power piston 4 to a piston 31 of the master cylinder 2 is slidably fitted onto the outer periphery of the first input shaft 17a. In this embodiment the output shaft 32 and the piston 31 constitute a single stepped hollow cylinder.

The forward end portion of the output shaft 32 extends to the neighborhood of the second valve seat 18 of the input shaft 17 and sandwiches the power piston 4 and the valve body 5 between a nut member 33, screwed at the forward end portion of the output shaft 32, so that these portions can operate together. The output shaft 32 is slidably passed through the axis portion of the housing 11 of the master cylinder 2 while maintaining a liquid-tight seal by a pair of seal members 40 and 41 provided at the housing 11.

In the illustrated embodiment, the master cylinder 2 is a two-system type master cylinder, and the piston 31, integrally formed with the output shaft 32, is caused to operate as a primary side piston. A secondary side piston 42 is slidably fitted between the output shaft 32 and a sleeve 12 in a liquid-tight seal manner, and the sleeve 12 is fixed to the housing 11 of the master cylinder 2. The piston 42 is normally urged to abut against a stopper ring 44 provided on the output shaft 32 by a spring 43 located between the primary side and the secondary side pistons 31 and 42.

The two system master cylinder 2 may otherwise be formed in the same manner as a conventionally known two system master cylinder, except for the special structure of the pistons 31 and 42, and therefore the conventional structure is omitted for simplicity. In FIG. 1, reference numerals 45, 46 and 47 are a pressure chamber in one system, another pressure chamber in the other system, and a reservoir respectively.

Further, in this embodiment, a hydraulic pressure reaction force chamber 50 is provided between the input shaft 17 and the output shaft 32. Particularly, the reaction force chamber 50 is formed between a seal member 52 provided at a ring 51 engaged with the stepped portion of the output shaft 32 and an elastic member 53 provided at a necessary interval from the seal member 52, the elastic member 53 also being used as a seal member. The elastic member 53 is fixed at its outer periphery to the output shaft 32 by causing a metal support 54, disposed at the outer periphery of the right end portion of the elastic member 53, to contact a stopper ring 55 attached to the output shaft 32. A reinforcing ring 56, attached to the right end inner periphery of the elastic member 53, is disposed to face an end surface 17d of a stepped portion formed in the input shaft 17 with an interval δ therebetween so that the hydraulic pressure in the reaction force chamber 50 can be transmitted as reaction force to the input shaft 17 only when the ring 56 and the end surface 17d are made to contact each other. Further, the hydraulic pressure reaction force chamber 50 normally communicates with the pressure chamber 45 on the primary side through a passage 57 bored in the output shaft 32 such that the distance L between the left end surface of the piston 31 and the passage 57 is larger than the distance l between the seal member 58 of the secondary side piston 42 and the right end of the secondary side piston 42, so that, as will be further described in detail, the hydraulic pressure can be led into the reaction force chamber 50 from the secondary side pressure chamber 46 in an abnormal case where no hydraulic pressure is generated in the pressure chamber 45.

In the above-mentioned arrangement, in the illustrated non-actuated state, the power piston 4 and the valve body 5 are held in a position where they are urged to contact the housing 11 of the master cylinder 2 due to the atmospheric pressure acting on the valve body 5 through the opening 9 of the front shell 1a, and the integral output shaft 32 is also held at its illustrated non-actuated position. The input shaft 17 is biased rightwards by the spring 22 but prevented by the output shaft 32 from going rightwards, and in this state the valve member 19 is caused to be seated onto the first valve seat 16 to block the communication of the variable pressure chamber 8 with the atmospheric air, while the valve member 19 is separated from the second valve seat 18 to provide communication between the variable pressure chamber 8 and the constant pressure chamber 7. Accordingly, the negative pressure led into the constant pressure chamber 7 from a negative pressure inlet (not shown) is further led into the variable pressure chamber 8 through the passages 26, 25, a gap between the valve member 19 and the second valve seat 18, and the passages 27 and 28, so that no pressure difference is produced between the front and the rear side of the power piston 4.

Under this condition, when the brake pedal (not shown) is depressed to cause the input shaft 17 to move left, the valve member 19 is seated on the second valve seat 18 to block the communication between the constant pressure chamber 7 and the variable pressure chamber 8, and the subsequent left movement of the input shaft 17 causes the valve member 19 to separate from the first valve seat 16. Accordingly, the atmospheric air is led into the variable pressure chamber 8 through the filter 24, the passage 23, the gap between the valve member 19 and the first valve seat 16, and the passages 27 and 28, so as to generate a pressure difference between the front side and the rear side of the power piston 4 and the valve body 5 so that the piston 4 and the valve body 5 are caused to move left.

When the piston 4 is caused to move left, the thrust is transmitted through the output shaft 32 to the primary side piston 31 of the master cyliner 2 to cause the piston 31 to move left to generate braking hydraulic pressure in the pressure chamber 45 so that the secondary side piston 42 is caused to move left to generate braking hydraulic pressure in the pressure chamber 46. As is conventionally known well, the braking hydraulic pressures generated in the respective pressure chambers 45 and 46 are supplied to the wheel cylinders (not shown) to effect the braking function.

Although the braking hydraulic pressure generated in the pressure chamber 45 is led through the passage 57 into the hydraulic pressure reaction force chamber 50, the gap δ between the elastic member 53 and the stepped portion 17d of the input shaft 17 is maintained before the pressure becomes sufficiently large and therefore no reaction force is transmitted to the input shaft 17. If the pressure in the reaction force chamber 50 is increased to elastically deform the elastic member 53 to narrow and eliminate the gap δ in which case the elastic member 53 abuts against the stepped portion 17d, the pressure in the reaction force chamber 50 is transmitted as reaction force to the input shaft 17.

In the case where no braking hydraulic pressure is generated due to the damage caused in the system on the pressure chamber 45 side, the primary side piston 31 abuts against the secondary side piston 42 as shown in FIG. 2 so as to generate braking hydraulic pressure in the pressure chamber 46. Under this condition, the passage 57 of the reaction chamber 50 opens into the secondary side pressure chamber 46 due to the difference between the above-mentioned distances L and l, (L>l), and therefore the reaction force can be obtained even in this case.

Further, in the case where the system damage is generated on the pressure chamber 46 side, it is apparent that the reaction force can be obtained by the same operation as that in the above-mentioned normal state. Furthermore, when the depression of the brake pedal is released in the above-mentioned braking state, it is apparent that the valve mechanism 16 is switched into the illustrated state as shown in the drawing so that the non-actuated state is recovered.

Figure 3:
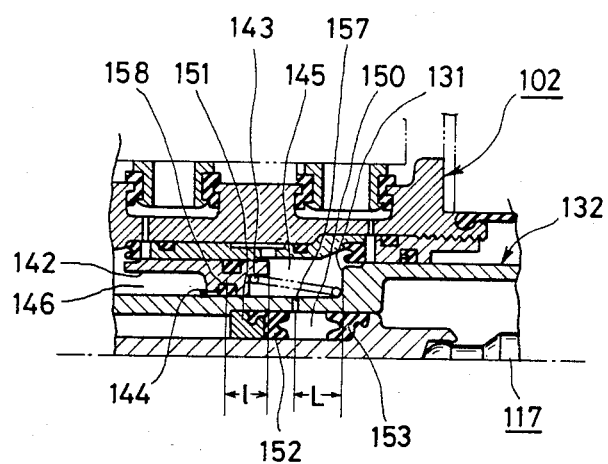
FIG. 3 is a partial cross-sectional view of a main portion of another embodiment of the present invention.

FIG. 3 shows a main part of another embodiment of the present invention, in which the gap δ formed in the above-described embodiment between the elastic member 53 and the stepped portion 17d of the input shaft 17 is omitted so as to simplify the structure. This embodiment has the same configuration as the FIG. 1 embodiment except for the above-mentioned point, and therefore parts similar to or corresponding to those in FIG. 1 are designated by reference numerals obtained by adding 100 to the same reference numerals as those used in FIG. 1.

As described above, according to the present invention, there is an advantage that a partial loss of braking force is not detected by the driver as reaction force before braking begins by a very simple arrangement using an elastic member 53.

Further, according to the present invention, there is another advantage that since a hydraulic pressure can be led into the hydraulic pressure reaction force chamber 50 so as to enable the driver to sense the brake reaction force if at least one system is in a normal state, the braking can be safely and surely performed even if any one of the systems is damaged.

I claim:

1. A reaction force mechanism for a brake power booster, comprising:

a power piston (4) slidably disposed in a shell (1);
   a master cylinder (2) connected to said shell on a brake pedal side;
   an output shaft (32) for linking said power piston with a second piston (31) of said master cylinder;
   an elastic member (53) situated between said output shaft (32) and an input shaft (17), and forming a boundary of a first hydraulic pressure reaction force chamber (50) and capable of being elastically deformed upon reception of pressure in said first hydraulic pressure chamber;
   a passage (57) for providing communication between said first hydraulic pressure chamber and a second pressure chamber (45) of said master cylinder;
   said input shaft (17) having an end surface (17d) disposed in opposition to said elastic member with a predetermined distance (δ) therebetween, said elastic member being made to abut against said end surface when it is elastically deformed so that the pressure in said first hydraulic pressure chamber is transmitted to said input shaft; and
   a valve mechanism (15) linked to said input shaft so as to be actuated to generate a fluid pressure difference between a front side and a rear side of said power piston.

2. The reaction force mechanism as claimed in claim 1, wherein said valve mechanism comprises:
   first (16) and second (18) valve seats;
   a valve member (19) sealingly movable so as to engage either of said valve seats;
   a first spring (21) for normally urging said valve member against said first valve seat; and
   a second spring (22) for normally urging said second valve seat away from said valve member.

3. The reaction force mechanism as claimed in claim 2, wherein said second valve seat is located at a tip end portion of said input shaft adjacent an inner side of said first valve seat.

4. The reaction force mechanism as claimed in claim 3, wherein said valve mechanism further comprises:
   means (10, 20, 23, 24) providing communication between atmospheric air and said first valve seat;
   a cylindrical seal portion (19a) fixed on said valve member;
   means (25, 26) providing communication between said front side of said power piston and said second valve seat; and
   means (27, 28) providing communication between said first valve seat and said rear side of said power piston as well as between said second valve seat and said rear side of said power piston.

5. The reaction force mechanism as claimed in claim 2, further comprising a nut member (33) screwed at a forward end part of said output shaft.

6. The reaction force mechanism as claimed in claim 1, wherein said output shaft and said second piston constitute a single stepped hollow cylinder (31, 32).

7. The reaction force mechanism as claimed in claim 5, wherein said master cylinder comprises a two-system master cylinder, said second piston being a primary side piston (31); and further comprising a secondary side piston (42) slidably fitted between said output shaft and a sleeve (12) disposed radially outward from said output shaft.

8. The reaction force mechanism as claimed in claim 7, further comprising means (43) for axially biasing said secondary side piston normally against a stopper ring (44).

9. The reaction force mechanism as claimed in claim 8, wherein said means for axially biasing said secondary side piston against said stopper ring further biases said primary side piston away from said secondary side piston.

10. The reaction force mechanism as claimed in claim 7, wherein a distance (L) between said passage and an end of said primary side piston is greater than a distance (l) between an end of said secondary side piston and a seal member (58) of said secondary side piston.

11. The reaction force mechanism as claimed in claim 1, wherein said end surface forms a step (17d).

12. A reaction force mechanism for a brake power booster, comprising:
   a power piston (4) slidably disposed in a shell (1);
   a two-system master cylinder (2) connected to said shell on a brake pedal side;
   an input shaft (17) passing through said master cylinder;
   a valve mechanism (15) linked to said input shaft so as to be actuated to generate a fluid pressure difference between a front side and a rear side of said power piston;
   an output shaft (32) for linking said power piston with a primary side piston (31) of said master cylinder on its primary side;
   a passage (57) which normally opens into a pressure chamber (45) of said master cylinder on its primary side;
   means for opening said passage to another pressure chamber (46) of said master cylinder on its secondary side in an abnormal case where no hydraulic pressure is established in said primary side pressure chamber and hydraulic pressure is established in said another pressure chamber (46) upon generation of said fluid pressure difference between said front and rear sides of said power piston.

13. The reaction force mechanism as claimed in claim 12, wherein said opening means includes a secondary side piston (42) axially spaced and urged from said primary side piston by a spring (43), a distant (L) between said passage and an end of said primary side piston confronting said secondary side piston being greater than a distance (l) between an end of said secondary side piston and a seal member (58) of said secondary side piston.

14. The reaction force mechanism as claimed in claim 13, wherein said valve mechanism comprises:
   first (16) and second (18) valve seats;
   a valve member (19) sealingly movable so as to engage either of said valve seats;
   a first spring (21) for normally urging said valve member against said first valve seat; and
   a second spring (22) for normally urging said second valve seat away from said valve member.

15. The reaction force mechanism as claimed in claim 14, wherein said second valve seat is located at a tip end portion of said input shaft adjacent an inner side of said first valve seat.

16. The reaction force mechanism as claimed in claim 15, wherein said valve mechanism further comprises;
   means (10, 20, 23, 24) providing communication between atmospheric air and said first valve seat;
   a cylindrical seal portion (19a) fixed on said valve member;
   means (25, 26) providing communication between said front side of said power piston and second valve seat; and
   means (27, 28) providing communication between said first valve seat and said rear side of said power piston as well as between said second valve seat and said rear side of said power piston.

17. The reaction force mechanism as claimed in claim 16, wherein said output shaft and said primary side piston constitute a single stepped hollow cylinder (31, 32).

18. The reaction force mechanism as claimed in claim 15, further comprising a nut member (33) screwed at a forward end part of said output shaft.

* * * * *